United States Patent
Huang et al.

(10) Patent No.: US 12,308,925 B2
(45) Date of Patent: May 20, 2025

(54) SIGNAL COMMUNICATION METHOD AND APPARATUS

(71) Applicant: DATANG MOBILE COMMUNICATIONS EQUIPMENT CO., LTD., Beijing (CN)

(72) Inventors: Qiuping Huang, Beijing (CN); Runhua Chen, Beijing (CN); Qiubin Gao, Beijing (CN)

(73) Assignee: DATANG MOBILE COMMUNICATIONS EQUIPMENT CO., LTD., Beijing (CN)

(*) Notice: Subject to any disclaimer, the term of this patent is extended or adjusted under 35 U.S.C. 154(b) by 340 days.

(21) Appl. No.: 17/778,412

(22) PCT Filed: Nov. 16, 2020

(86) PCT No.: PCT/CN2020/129149
§ 371 (c)(1),
(2) Date: May 20, 2022

(87) PCT Pub. No.: WO2021/098654
PCT Pub. Date: May 27, 2021

(65) Prior Publication Data
US 2023/0006726 A1    Jan. 5, 2023

(30) Foreign Application Priority Data
Nov. 21, 2019 (CN) .......................... 201911151190.6

(51) Int. Cl.
*H04B 7/06* (2006.01)
*H04W 16/28* (2009.01)
(Continued)

(52) U.S. Cl.
CPC .......... *H04B 7/0695* (2013.01); *H04W 16/28* (2013.01); *H04W 72/23* (2023.01); *H04W 76/19* (2018.02)

(58) Field of Classification Search
CPC .... H04B 7/0695; H04B 7/088; H04B 7/0404; H04W 16/28; H04W 72/23; H04W 76/19;
(Continued)

(56) References Cited

U.S. PATENT DOCUMENTS 11,855,740 B2 * 12/2023 Zhang .................. H04W 76/11
11,864,049 B2 * 1/2024 Park ....................... H04W 36/14
(Continued)

FOREIGN PATENT DOCUMENTS

CN      108112074 A     6/2018
CN      109089322 A    12/2018
(Continued)

OTHER PUBLICATIONS

InterDigital, Inc.,"On Remaining Details of Beam Failure Recovery", 3GPP TSG RAN WG1 Meeting #90, Prague, P.R. Czech Aug. 21-25, 2017, total 4 pages, R1-1714142.
(Continued)

*Primary Examiner* — Brian T O Connor
(74) *Attorney, Agent, or Firm* — Kilpatrick Townsend & Stockton LLP (57) ABSTRACT

Disclosed are a signal communication method and apparatus. A signal sending method provided in the present application includes: determining that beam failure occurs in a cell; and sending a Physical Uplink Control Channel, PUCCH, through an uplink sending beam when a preset condition is satisfied in a case that a terminal needs to send the PUCCH.

19 Claims, 4 Drawing Sheets

S101 — Determining that beam failure occurs in a cell

S102 — Sending a PUCCH through an uplink sending beam when a preset condition is satisfied in a case that a terminal needs to send the PUCCH (51) Int. Cl.
*H04W 72/23* (2023.01)
*H04W 76/19* (2018.01)

(58) Field of Classification Search
CPC .... H04W 72/046; H04W 72/21; H04L 5/001; H04L 5/0023; H04L 5/0048; H04L 5/0053; H04L 5/0091
See application file for complete search history.

(56) References Cited

U.S. PATENT DOCUMENTS

| | | | |
|---|---|---|---|
| 11,924,837 B2* | 3/2024 | Zhou | H04W 72/23 |
| 11,937,320 B2* | 3/2024 | Kim | H04W 24/04 |
| 11,943,641 B2* | 3/2024 | Nagaraja | H04W 72/1268 |
| 11,979,351 B2* | 5/2024 | Matsumura | H04W 24/00 |
| 2019/0190582 A1 | 6/2019 | Guo et al. | |
| 2019/0207705 A1 | 7/2019 | Zhou et al. | |
| 2019/0230730 A1 | 7/2019 | Wang et al. | |
| 2019/0306909 A1 | 10/2019 | Zhou et al. | |
| 2019/0335524 A1* | 10/2019 | Wang | H04W 76/27 |

FOREIGN PATENT DOCUMENTS

| | | |
|---|---|---|
| CN | 110149177 A | 8/2019 |
| CN | 110393033 A | 10/2019 |
| CN | 110475337 A | 11/2019 |
| EP | 3547566 A1 | 10/2019 |
| TW | 201937957 A | 9/2019 |

OTHER PUBLICATIONS

Ericsson, "Remaining issues on multi-beam enhancements", 3GPP TSG-RAN WG1 Meeting #99, Reno, USA, Nov. 18-22, 2019, total 17 pages, Tdoc R1-1912058.

Intel Corporation, "Discussion on multi-beam enhancements", 3GPP TSG RAN WG1 Meeting #99, Reno, USA, Nov. 18-Nov. 22, 2019, total 10 pages, R1-1912223.

* cited by examiner

SIGNAL COMMUNICATION METHOD AND APPARATUS

CROSS-REFERENCE OF RELATED APPLICATIONS

This application is a US National Stage of International Application No. PCT/CN2020/129149, filed on Nov. 16, 2020, which claims priority to Chinese Patent Application No. 201911151190.6, filed with the China National Intellectual Property Administration on Nov. 21, 2019 and entitled "Signal Communication Method and Apparatus", which is hereby incorporated by reference in its entirety.

FIELD

The present application relates to the field of communication technologies, and particularly to a signal communication method and apparatus.

BACKGROUND

For wireless communication systems, the use of analog beamforming for downlink signal transmission can achieve higher beamforming gain and larger coverage. An important challenge for analog beamforming in high-frequency systems is large propagation loss and high probability of being blocked for transmission signals. When a Physical Downlink Control Channel (PDCCH) is blocked, a terminal may not be able to accurately obtain control information of downlink transmission, resulting in degraded reception performance, for example, a transmission rate is decreased, a scheduling delay is increased, user experience is decreased, and so on.

In the related art, after a terminal detects beam failure, there is no definition on what kind of receiving beam the terminal uses to receive channel signals other than PDCCH and what kind of sending beam the terminal uses to send uplink signals.

SUMMARY

Embodiments of the present application provide a signal communication method and apparatus, to implement PUCCH transmission through a beam for sending a beam failure event of a cell in a case that beam failure occurs in the cell.

In a first aspect, on a terminal side, a signal sending method provided by an embodiment of the present application includes: determining that beam failure occurs in a cell; sending a Physical Uplink Control Channel (PUCCH) through an uplink sending beam when a preset condition is satisfied in a case that a terminal needs to send the PUCCH, where the uplink sending beam includes: a beam for sending at least one of a beam failure event of the cell, an identifier of the cell, or information indicating a new beam for the cell; or, an uplink beam corresponding to spatial relation information of a resource for carrying the beam failure event of the cell; or, a beam for sending the identifier of the cell and/or the information indicating the new beam for the cell; or, an uplink beam corresponding to spatial relation information of a resource carrying the identifier of the cell and/or the new beam for the cell; or, an uplink beam corresponding to a reported new beam for the cell.

With this method, it is determined that beam failure occurs in a cell; a PUCCH is sent through an uplink sending beam when a preset condition is satisfied in a case that a terminal needs to send the PUCCH, where the uplink sending beam includes: a beam for sending at least one of a beam failure event of the cell, an identifier of the cell, or information indicating a new beam for the cell; or an uplink beam corresponding to spatial relation information of a resource for carrying the beam failure event of the cell; or a beam for sending the identifier of the cell and/or the information indicating the new beam for the cell; or an uplink beam corresponding to spatial relation information of a resource carrying the identifier of the cell and/or the new beam for the cell; or an uplink beam corresponding to a reported new beam for the cell, and the transmission of the PUCCH is achieved through the beam for sending the beam failure event of the cell when the beam failure occurs in the cell.

In one embodiment, the preset condition includes: receiving specific information or a specific signal.

In one embodiment, sending the PUCCH through the uplink sending beam when the preset condition is satisfied, includes: sending the PUCCH through the uplink sending beam starting from a $K^{th}$ time unit after receiving the specific information or specific signal; or, sending the PUCCH through the uplink sending beam after K time units after receiving the specific information or specific signal; where K is a preset non-negative integer.

In one embodiment, sending the PUCCH through the uplink sending beam after K time units after receiving the specific information or specific signal, includes: sending the PUCCH through the uplink sending beam starting from a first slot after K time units after receiving the specific information or specific signal.

In one embodiment, the specific information includes one or more of: a beam failure recovery response of the cell; uplink grant information (UL grant) received by the terminal after sending a PUCCH reporting the beam failure event of the cell.

In one embodiment, the specific signal is a signal carrying the specific information.

In one embodiment, the specific signal is a Physical Downlink Control Channel (PDCCH).

In a second aspect, on a network side, a signal receiving method provided by an embodiment of the present application includes: receiving a beam failure event of a cell reported by a terminal in a case that beam failure occurs in the cell; receiving a PUCCH sent by the terminal through an uplink sending beam; where the uplink sending beam includes: a beam for sending at least one of the beam failure event of the cell, an identifier of the cell, or information indicating a new beam for the cell; or, an uplink beam corresponding to spatial relation information of a resource for carrying the beam failure event of the cell; or, a beam for sending the identifier of the cell and/or the information indicating the new beam for the cell; or, an uplink beam corresponding to spatial relation information of a resource carrying the identifier of the cell and/or the new beam for the cell; or, an uplink beam corresponding to a reported new beam for the cell.

In one embodiment, the method further includes: sending specific information or a specific signal to the terminal.

In one embodiment, the PUCCH is a PUCCH sent by the terminal through the uplink sending beam starting from a $K^{th}$ time unit after receiving the specific information or specific signal; or, the PUCCH is a PUCCH sent by the terminal through the uplink sending beam after K time units after receiving the specific information or specific signal; where K is a preset non-negative integer.

In one embodiment, the specific information includes one or more of: a beam failure recovery response of the cell; uplink grant information, UL grant, received by the terminal after sending a PUCCH reporting the beam failure event of the cell.

In one embodiment, the specific signal is a Physical Downlink Control Channel (PDCCH).

In one embodiment, receiving the PUCCH sent by the terminal through the uplink sending beam, includes: receiving the PUCCH sent by the terminal through the uplink sending beam by using a receiving beam corresponding to the uplink sending beam.

In a third aspect, on the terminal side, a signal sending apparatus provided by an embodiment of the present application includes: a determining device configured to determine that beam failure occurs in a cell; a sending device configured to send a PUCCH through an uplink sending beam when a preset condition is satisfied in a case that a terminal needs to send the PUCCH, where the uplink sending beam includes: a beam for sending at least one of a beam failure event of the cell, an identifier of the cell, or information indicating a new beam for the cell; or, an uplink beam corresponding to spatial relation information of a resource for carrying the beam failure event of the cell; or, a beam for sending the identifier of the cell and/or the information indicating the new beam for the cell; or, an uplink beam corresponding to spatial relation information of a resource carrying the identifier of the cell and/or the new beam for the cell; or, an uplink beam corresponding to a reported new beam for the cell.

In a fourth aspect, on the network side, a signal receiving apparatus provided by an embodiment of the present application includes: a first device configured to receive a beam failure event of a cell reported by a terminal in a case that beam failure occurs in the cell; a second device configured to receive a PUCCH sent by the terminal through an uplink sending beam; where the uplink sending beam includes: a beam for sending at least one of the beam failure event of the cell, an identifier of the cell, or information indicating a new beam for the cell; or, an uplink beam corresponding to spatial relation information of a resource for carrying the beam failure event of the cell; or, a beam for sending the identifier of the cell and/or the information indicating the new beam for the cell; or, an uplink beam corresponding to spatial relation information of a resource carrying the identifier of the cell and/or the new beam for the cell; or, an uplink beam corresponding to a reported new beam for the cell.

In a fifth aspect, on the terminal side, another signal sending apparatus provided by an embodiment of the present application includes: a memory configured to store program instructions; a processor configured to invoke the program instructions stored in the memory, and execute the steps of the signal sending method provided in the first aspect according to the obtained program.

In a sixth aspect, on the network side, another signal receiving apparatus provided by an embodiment of the present application includes: a memory configured to store program instructions; a processor configured to invoke the program instructions stored in the memory, and execute the steps of the signal receiving method provided in the second aspect according to the obtained program.

Another embodiment of the present application provides a computing device, which includes a memory and a processor, where the memory is configured to store the program instructions, and the processor is configured to invoke the program instructions stored in the memory and perform any one of the above-mentioned methods in accordance with the obtained program.

Another embodiment of the present application provides a computer storage medium storing the computer executable instructions which are configured to cause the computer to perform any one of the above-mentioned methods.

BRIEF DESCRIPTION OF THE DRAWINGS

In order to illustrate embodiments of the present application more clearly, the accompanying drawings which need to be used in describing embodiments will be introduced below briefly. The accompanying drawings described below are only some embodiments of the present application, and other accompanying drawings can also be obtained according to these accompanying drawings.

DETAILED DESCRIPTION OF EMBODIMENTS

Embodiments of the present application will be described clearly and completely below in combination with the accompanying drawings in embodiments of the present application. The described embodiments are only a part of embodiments of the present application but not all embodiments. Based upon embodiments of the present application, all of other embodiments.

In a communication system such as Long Term Evolution (LTE), when all downlink beams configured for the PDCCH fail, it is considered that a radio link fails, and a radio link reconstruction process is started. This method may not only increase the time delay, but also cause waste of resources, because changing a sending beam and/or receiving beam may enable receiving quality of a downlink control signal to meet requirements. In order to avoid such resource waste and delay, a fast and reliable beam failure detection and recovery process is standardized in the New Radio (NR) standard, and the network side can quickly recover the transmission process from beam failure. The beam failure recovery process of the primary cell (Pcell) is specified in the Release 15 (Rel-15) phase of the NR standard, and the beam failure recovery process of the secondary cell (SCell) is specified in the Release 16 (Rel-16) phase of the NR standard.

A UE may be configured with one or more SCells after initial access. An SCell may be configured to have only downlink (DL) or include both DL and uplink (UL).

Each SCell may be configured with a Beam Failure Recovery (BFR) process. The beam failure recovery process is as follows.

The UE monitors beam failure, and if the UE detects beam failure of the SCell DL, the UE sends a Beam Failure Recovery reQuest (BFRQ) to a base station. The beam failure recovery request sent by the UE at least includes report of a beam failure event and report of an identifier (or index/indices) of a Component Carrier (CC) in which the beam failure occurs. If the UE detects a new beam that meets a quality condition, the UE may also report an identifier (or index/indices) of the new beam to the base station.

After the base station receives the report of the beam failure event from the UE, the base station may reconfigure a downlink beam for the SCell in which the beam failure occurs.

In order to perform the BFR, the UE measures downlink beam quality of a PDCCH (or considered to measure channel quality of a Control Resource SET (CORESET)). The UE performs beam failure detection of the SCell by detecting quality of a downlink reference signal for Beam Failure Detection (BFD) of the SCell. The downlink reference signal for the BFD of the SCell may be explicitly configured through Radio Resource Control (RRC) or implicitly configured through Transmission Configuration Indicator (TCI) state. Each SCell may be configured with at most 8 downlink beams, for example, at most 8 TCI states or at most 8 downlink reference signals for BFD. The beams of the downlink control channel are a subset of active TCI states.

The process regarding the Beam Failure Recovery reQuest (BFRQ) of the UE for the SCell includes two following steps.

Step 1: the UE reports a beam failure event.

Step 2: the UE reports an index/indices of a CC in which beam failure occurs and new beam information (if there is a new beam).

Here, the information in Step 1 may be sent through a SR-like (Schedule Request-like) PUCCH resource specially configured for the BFR. The SR-like PUCCH refers to a PUCCH with a similar sending method as sending of the Schedule Request (SR). The information in Step 2 is sent through a Media Access Control Control Element (MAC-CE) in a Physical Uplink Shared Channel (PUSCH). It should be noted that reporting the beam failure event through the SR-like PUCCH specially configured for the BFR is not necessarily the only way to report the beam failure event.

The MAC-CE for carrying the index/indices of the CC in which the beam failure occurs and/or the BFR new beam information may be carried on the PUSCH corresponding to the PUCCH sending the beam failure event (the PUSCH scheduled based on the schedule request of the PUCCH), or may be multiplexed on an existing PUSCH resource, for example, multiplexed on a configured grant PUSCH.

If the MAC-CE of Step 2 indicates a new beam and is detected by the UE, the UE uses the new beam indicated by the MAC-CE of Step 2 for downlink reception of the PDCCH on the SCell in which the beam failure occurs after K symbols (K is a positive integer) after the UE receives a response to the MAC-CE of Step 2. This applies to all CORESETs of the SCell in which the beam failure occurs.

However, after the UE detects beam failure and receives a BFR response, there is currently no solution for what kind of receiving beam the UE uses to receive channel signals other than PDCCH and what kind of sending beam the UE uses to send uplink signals.

Therefore, embodiments of the present application provide a signal communication method and apparatus to provide relevant solutions, and the UE can use a better uplink sending beam to send the PUCCH, and the UE and the network side have the same consensus on the sending beam of the uplink signal, and the base station can use the optimal reception beam to receive the uplink signal, ensuring the system performance.

Here, the method and apparatus are based on the same application concept. Since the principle of solving the problem in the method is similar to that in the apparatus, implementations of the apparatus and method can refer to each other, and the repeated description thereof will be omitted.

Embodiments of the present application may be applicable to various systems, especially 5G systems. For example, the applicable systems may be: Global System of Mobile communication (GSM) system, Code Division Multiple Access (CDMA) system, Wideband Code Division Multiple Access (WCDMA) system, General Packet Radio Service (GPRS) system, Long Term Evolution (LTE) system, LTE Frequency Division Duplex (FDD) system, LTE Time Division Duplex (TDD) system, Universal Mobile Telecommunication System (UMTS), Worldwide interoperability for Microwave Access (WiMAX) system, 5G system and 5G NR system, etc. These systems all include terminal devices and network devices.

The terminal device involved in embodiments of the present application may be a device for providing voice and/or data connectivity to the user, a handheld device with a wireless connection function, or other processing device connected to a wireless modem. In different systems, the terminal device may have different names. For example, in a 5G system, the terminal device may be referred to as User Equipment (UE). The wireless terminal device may communicate with one or more core networks via the RAN, and the wireless terminal device may be a mobile terminal, such as a mobile telephone (or called "cellular" telephone), and a computer with the mobile terminal, for example, may be a portable, pocket, handheld, computer built-in or vehicle-carried mobile device, and the mobile terminal exchanges voice and/or data with a radio access network. For example, the wireless terminal device may be a Personal Communication Service (PCS) telephone, a cordless telephone, a Session Initiation Protocol (SIP) telephone, a Wireless Local Loop (WLL) station, a Personal Digital Assistant (PDA) and other devices. The wireless terminal device may also be called as a system, a subscriber device, a subscriber station, a mobile station, a mobile, a remote station, an access point, a remote terminal, an access terminal, a user terminal, a user agent, a user device, which is not limited in embodiments of the present application.

The network device involved in embodiments of the present application may be a base station, which may include multiple cells. Depending on specific application scenarios, the base station may also be called as an access point, or may refer to the device in the access network communicating with the wireless terminal via one or more sectors over the air interface, or other names. The network device may be used to perform inter-conversion between the received air frame and Internet Protocol (IP) packet, and used as the router between the wireless terminal device and the rest of the access network, where the rest of the access network may include IP networks. The network device may further coordinate attribute management of the air interface. For example, the network device involved in embodiments of the present application may be a network device (Base Transceiver Station (BTS)) in the Global System of Mobile communication (GSM) or Code Division Multiple Access (CDMA), or may be a network device (NodeB) in the Wideband Code Division Multiple Access (WCDMA), or may be an evolutional network device (evolutional Node B (eNB or e-NodeB)) in the Long Term Evolution (LTE) system, a 5G base station in the 5G network architecture (next generation system), or may be a Home evolved Node B (HeNB), a relay node, femto, pico, etc., which is not limited in embodiments of the present application.

Embodiments of the present application will be described below in detail with reference to the drawings of the specification. It should be noted that the showing order of embodiments of the present application only represents a sequential order of embodiments, but does not represent the pros and cons provided by embodiments.

Embodiments of the present application are applicable to systems including but not limited to NR systems, LTE systems, 6G systems, and systems of their evolved versions.

Embodiments of the present application propose a signal sending method of a UE after beam failure occurs in a cell, and the UE can use a better uplink sending beam to send the PUCCH, and the UE and the network side have the same consensus on the sending beam of the uplink signal, and the base station can use the optimal reception beam to receive the uplink signal, ensuring the performance of the uplink transmission.

Regarding the beam failure of the cell, a determination method is as follows: the UE measures quality of downlink beams corresponding to the cell; and if the quality of each downlink beam is lower than a preset condition, the UE considers that a beam failure event occurs. The downlink beams may be configured by a base station or predefined. For example, the downlink beams are beams of all downlink control channels of the cell. For another example, the downlink beams are downlink beams corresponding to a reference signal for beam failure monitoring configured by the base station for the terminal.

Some possible ways for the UE to determine whether the quality of a downlink beam is lower than a preset condition are as follows: the UE measures received strength of the reference signal using the downlink beam and determines whether the received strength is greater than a threshold, if the received strength is less than a threshold, it is considered that the quality of the downlink beam is lower than the preset condition, and the downlink beam fails; the UE measures performance of the reference signal using the downlink beam and maps the performance to a Block Error Ratio (BLER) of the PDCCH, if the value of the BLER is higher than a set threshold (for example, BLER=10%), it is considered that the quality of the downlink beam is lower than the preset condition, and the beam fails, etc.

After determining that beam failure occurs in a cell, the UE may report the beam failure event of the cell.

When or after reporting the beam failure event of the cell, the UE may also report a new beam (for example, a beam with quality higher than a preset condition) that is considered by the UE to be able to perform normal communication. The new beam may be reported in the form of an indicative reference signal. The process in which the UE reports the beam failure event and the new beam may be regarded as the process of sending a beam failure recovery request.

A process in which a UE sends a beam failure recovery request of a cell is as follows.

The UE reports a beam failure event and/or a new beam through a Physical Random Access Channel (PRACH) configured by the base station for beam failure recovery. There is a one-to-one correspondence between new beams and PRACHs. After receiving the PRACH, the base station may determine that a beam failure event has occurs to the UE, and/or determine a new beam.

A process for sending a cell beam failure recovery request is as follows.

Step 1: a UE reports a beam failure event through a PUCCH.

Step 2: the UE reports an identifier and/or new beam information of a cell where the beam failure occurs through an MAC-CE (if there is a new beam to be reported, the new beam information is reported).

Here, the PUCCH in Step 1 is a PUCCH for sending the beam failure event, and may be sent through the PUCCH resource that is specially configured for the BFR and similar to sending the SR. For the convenience of description, in an embodiment of the present application, the PUCCH for sending the beam failure event is called PUCCH-BFR, and the PUCCH resource is called PUCCH-BFR resource; and the information in Step 2 may be reported through PUSCH.

In one embodiment, the identifier of the cell where the beam failure occurs is reported in the form of index/indices of the CC where the beam failure occurs.

Some embodiments of the present application include, but are not limited to, the above-mentioned method in which the UE sends the cell beam failure recovery request.

In the standard, there may be the following English description about embodiments of the present application.

For PUCCH in a failed SCell, starting from K symbols after receiving response to step 2 MAC-CE, UE applies the original UL beam (spatial relation info) of PUCCH-BFR resource used for the transmission of step 1, on the failed SCell.

This may be applied only when a new beam is identified, or applied regardless if a new beam is found.

This applies to all PUCCH resources on the failed SCell.

The above description contains at least following possible schemes.

Scheme 1: for the PUCCH in the SCell where the beam failure occurs, starting from K symbols after receiving the response to the MAC-CE in step 2, the UE uses the original uplink beam used to transmit the PUCCH-BFR resource in step 1 (to send the PUCCH).

In one embodiment, this scheme is implemented only when the UE identifies a new beam; or, this scheme may be applied regardless of whether the UE finds a new beam.

In one embodiment, this scheme is applicable to all PUCCH resources on the SCell with beam failure.

Scheme 2: for the PUCCH in the SCell where the beam failure occurs, starting from K symbols after receiving the response to the MAC-CE in step 2, the UE uses the spatial reference signal transmitting the PUCCH-BFR resource in step 1 as the spatial reference signal of the PUCCH.

In one embodiment, this scheme is implemented only when the UE identifies a new beam; or, this scheme may be applied regardless of whether the UE finds a new beam.

In one embodiment, this scheme is applicable to all PUCCH resources on the SCell with beam failure.

In one embodiment, the spatial reference signal is a signal indicated by the spatial relation information (spatial relation info).

Scheme 3: for the PUCCH in the SCell where the beam failure occurs, starting from K symbols after receiving the response to the MAC-CE in step 2, the UE uses the spatial reference signal of the PUCCH-BFR resource in step 1 as the spatial reference signal of the PUCCH.

In one embodiment, this scheme is implemented only when the UE identifies a new beam; or, this scheme may be applied regardless of whether the UE finds a new beam.

In one embodiment, this scheme is applicable to all PUCCH resources on the SCell with beam failure.

In one embodiment, the spatial reference signal is a signal indicated by the spatial relation information (spatial relation info).

In the present application, the MAC-CE in step 2 may be an MAC-CE for sending the identifier of the cell where the beam failure occurs and/or the indication information of the new beam. The PUCCH-BFR resources in step 1 may be the PUCCH resource for reporting the beam failure event. In one embodiment, the PUCCH-BFR resource is a PUCCH resource for beam failure recovery configured by the base station for the UE.

It should be understood that the present application is explained by taking SCell as an example and is also applicable to other cells such as PCell and cells without carrier aggregation. This embodiment is explained by taking the case where the UE uses PUCCH to report the beam failure event as an example, and the present application is also applicable to cases where the UE uses another uplink signal such as PRACH to report the beam failure event, and at this time, it is necessary to replace the "PUCCH-BFR resource in step 1" in this embodiment with the another uplink signal. This embodiment is explained by taking the case where the UE uses MAC-CE to report the identifier of the cell where the beam failure occurs and/or the new beam as an example, and it is also applicable to cases where the UE uses another uplink signal or information such as PRACH to report the beam failure event, and at this time, it is necessary to replace the "MAC-CE in step 2" in this embodiment with the another uplink signal or information such as PRACH.

In the standard, there may be the following English description about embodiments of the present application.

For PUCCH in a failed SCell, starting from K symbols after UE receives an UL grant after the transmission of step 1 PUCCH-BFR, UE applies the original UL beam (spatial relation info) of PUCCH-BFR resource used for the transmission of step 1, on the failed SCell.

This may be applied only when a new beam is identified, or applied regardless if a new beam is found.

This applies to all PUCCH resources on the failed SCell.

This applies when the UL grant is for new data transmission (e.g. NDI toggled), or regardless of the NDI status.

The above description contains at least following possible schemes.

Scheme 1: for the PUCCH in the SCell where the beam failure occurs, starting from K symbols after receiving the UL grant after the transmission of the PUCCH-BFR of step 1, the UE uses the original uplink beam used to transmit the PUCCH-BFR resource in step 1 (to send the PUCCH).

In one embodiment, this scheme is implemented only when the UE identifies a new beam; or, this scheme may be applied regardless of whether the UE finds a new beam.

In one embodiment, this scheme is applicable to all PUCCH resources on the SCell with beam failure.

In one embodiment, the UL grant is a UL grant for scheduling the new data (for example, the New Data Indicator (NDI) field in the UL grant indicates that the PUSCH is new data). In one embodiment, the UL grant is a normal UL grant to schedule the new data transmission for the HARQ process of the PUSCH carrying the MAC-CE of step 2, similar to the normal "ACK" for PUSCH (a normal uplink grant to schedule a new transmission for the same HARQ process as PUSCH carrying the step 2 MAC CE, which is the same as normal "ACK" for PUSCH). In one embodiment, the UL grant may be a UL grant to schedule the new data, or may be a UL grant not to schedule the new data.

Scheme 2: for the PUCCH in the SCell where the beam failure occurs, starting from K symbols after receiving the UL grant after the transmission of the PUCCH-BFR of step 1, the UE uses the spatial reference signal transmitting the PUCCH-BFR resource in step 1 as the spatial reference signal of the PUCCH.

In one embodiment, this scheme is implemented only when the UE identifies a new beam; or, this scheme may be applied regardless of whether the UE finds a new beam.

In one embodiment, this scheme is applicable to all PUCCH resources on the SCell with beam failure.

In one embodiment, the spatial reference signal is a signal for indicating an uplink sending beam. For example, the uplink sending beam is indicated by the spatial relation information (Spatial Relation Info).

In one embodiment, the UL grant is a UL grant for scheduling the new data (for example, the New Data Indicator (NDI) field in the UL grant indicates that the PUSCH is new data). In one embodiment, the UL grant is a normal UL grant to schedule the new data transmission for the HARQ process of the PUSCH carrying the MAC-CE of step 2, similar to the normal "ACK" for PUSCH (a normal uplink grant to schedule a new transmission for the same HARQ process as PUSCH carrying the step 2 MAC CE, which is the same as normal "ACK" for PUSCH). In one embodiment, the UL grant may be a UL grant to schedule the new data, or may be a UL grant not to schedule the new data.

Scheme 3: for the PUCCH in the SCell where the beam failure occurs, starting from K symbols after receiving the UL grant after the transmission of the PUCCH-BFR of step 1, the UE uses the spatial reference signal of the PUCCH-BFR resource in step 1 as the spatial reference signal of the PUCCH.

In one embodiment, this scheme is implemented only when the UE identifies a new beam; or, this scheme may be applied regardless of whether the UE finds a new beam.

In one embodiment, this scheme is applicable to all PUCCH resources on the SCell with beam failure.

In one embodiment, the spatial reference signal is a signal for indicating an uplink sending beam. For example, the uplink sending beam is indicated by the spatial relation information (Spatial Relation Info).

In one embodiment, the UL grant is a UL grant for scheduling the new data (for example, the New Data Indicator (NDI) field in the UL grant indicates that the PUSCH is new data). In one embodiment, the UL grant is a normal UL grant to schedule the new data transmission for the HARQ process of the PUSCH carrying the MAC-CE of step 2, similar to the normal "ACK" for PUSCH (a normal uplink grant to schedule a new transmission for the same HARQ process as PUSCH carrying the step 2 MAC CE, which is the same as normal "ACK" for PUSCH). In one embodiment, the UL grant may be a UL grant to schedule the new data, or may be a UL grant not to schedule the new data.

In the embodiments of the present application, for a cell in which beam failure occurs, the UE uses the uplink sending beam used by the uplink signal sending the beam failure event of the cell to send the PUCCH transmitted on the cell starting from the $K^{th}$ time unit after receiving specific information or the specific signal, or after K time units after receiving the specific information or the specific signal, or starting from the first slot after K time units after receiving the specific information or specific signal.

In one embodiment, the UE sets or replaces the spatial reference signal of the PUCCH to/with a spatial reference signal of the uplink signal carrying the beam failure event of the cell. The spatial reference signal here is a signal for indicating an uplink sending beam.

Here, K is a preset non-negative integer.

In one embodiment, K is agreed by the UE and the network side (for example, agreed in a protocol). Or, In one embodiment, K is indicated by the base station to the UE (for example, the base station indicates to the UE through RRC (Radio Resource Control) signaling and/or MAC-CE signaling and/or DCI signaling).

In one embodiment, the time device is a symbol. Or, In one embodiment, the time device is a slot. Of course, other types of time devices are also possible.

In one embodiment, the specific information includes one or more of: a beam failure recovery response of the cell where the beam failure occurs; a UL grant received by the UE after sending a PUCCH reporting the beam failure event of the cell where the beam failure occurs.

Here, the beam failure recovery response of the cell where the beam failure occurs may be a beam failure recovery response in regard to the cell. For example, the beam failure recovery response is a response in regard to MAC-CE, where the MAC-CE is reported by the UE to the base station, and the MAC-CE is an MAC-CE that sends the identifier of the CC where the beam failure occurs and/or the new beam information. In one embodiment, the identifier of the CC includes the identifier of the cell where the beam failure occurs.

Here, In one embodiment, the UL grant includes a UL grant to schedule the PUSCH sent in the cell, for example, DCI format 0_0, DCI format 0_1, etc. Or, In one embodiment, the UL grant includes the first UL grant to schedule the PUSCH sent in the cell, for example, DCI format 0_0, DCI format 0_1, etc. Or, In one embodiment, the UL grant is the first UL grant. Or, In one embodiment, the UL grant is a UL grant to schedule the new data. In one embodiment, the UL grant is a normal UL grant to schedule the new data transmission for the HARQ process of the PUSCH carrying the MAC-CE of step 2, similar to the normal "ACK" for PUSCH (a normal uplink grant to schedule a new transmission for the same HARQ process as PUSCH carrying the step 2 MAC CE, which is the same as normal "ACK" for PUSCH). Or, In one embodiment, the UL grant may be the first UL grant to schedule the new data. Or, In one embodiment, the UL grant is any UL grant.

In one embodiment, the specific signal is a signal carrying the specific information. For example, In one embodiment, the specific signal is a signal carrying a response to the MAC-CE reporting the identifier of the CC where the beam failure occurs and/or the new beam information, and the identifier of the CC where the beam failure occurs includes the identifier of the cell. In one embodiment, the specific signal is a signal carrying uplink grant information (UL grant) after the PUCCH reporting the beam failure event of the cell is sent, where the UL grant may be, for example, the first UL grant, or may be a UL grant to schedule the new data, etc.

In one embodiment, the specific signal may also be any PDCCH. In one embodiment, the PDCCH is a PDCCH instructing the UE to perform any uplink signal transmission in the cell, for example, a PDCCH instructing the UE to send an SRS, a PDCCH instructing the UE to send a PUSCH, etc.

In one embodiment, the specific signal may also be a predefined PDCCH. The predefined PDCCH is a PDCCH pre-agreed by the base station and the UE (for example, agreed in a protocol), or a PDCCH indicated by the base station to the UE in advance.

The embodiments of the present application may be applicable only to the SCell, or only to the PCell, or both of the SCell and PCell, which are not limited in the present application.

In one embodiment, the solution of the present application is used only when the UE has determined a new beam for the cell with beam failure.

In one embodiment, the embodiments of the present application may be applied, regardless of whether the UE finds a new beam for the cell with beam failure.

In one embodiment, the embodiments of the present application is applicable to all PUCCH resources of the cell.

In one embodiment, the embodiments of the present application is applicable to the case where the UE does not receive a PUCCH resource indicated or updated by the sending beam indication information (Spatial Relation Info) after receiving the specific information or signal.

In one embodiment, the uplink signal is a PUCCH (for example, PUCCH-BFR in step 1).

In the standard, there may also be following English description about embodiments of the present application: if PUCCH-BFR spatial relation info is associated with a DL RS, override with new beam. If PUCCH-BFR spatial relation info is associated with an UL RS, override with PUCCH-BFR beam.

The above description includes following possible schemes.

Scheme 1: In one embodiment, if the spatial relation information (Spatial Relation Info) of the PUCCH-BFR is associated with a downlink signal, the new beam reported by the UE during the beam failure recovery process is used to determine the beam of the PUCCH.

In one embodiment, if the spatial relation information (Spatial Relation Info) of the PUCCH-BFR is associated with an uplink signal, the sending beam of the PUCCH-BFR is used as the sending beam of the PUCCH.

In one embodiment, the PUCCH is a PUCCH transmitted on the cell where the beam failure occurs. For example, the PUCCH is a PUCCH transmitted on the cell where the beam failure occurs starting from the $K^{th}$ time unit after receiving the specific information or the specific signal, or after K time units after receiving the specific information or the specific signal, or starting from the first slot after K time units after receiving the specific information or specific signal.

In one embodiment, the PUCCH is a PUCCH transmitted on the cell that sends the PUCCH-BFR. For example, the PUCCH is a PUCCH transmitted on the cell where the beam failure occurs starting from the $K^{th}$ time unit after receiving the specific information or the specific signal, or after K time units after receiving the specific information or the specific signal, or starting from the first slot after K time units after receiving the specific information or specific signal.

Scheme 2: In one embodiment, if the spatial relation information (Spatial Relation Info) of the PUCCH-BFR is associated with a downlink signal, the reference signal corresponding to the new beam reported by the UE during the beam failure recovery process is used as the beam reference signal of the PUCCH. The beam reference signal is a reference signal for determining a sending beam.

In one embodiment, if the spatial relation information (Spatial Relation Info) of the PUCCH-BFR is associated with an uplink signal, the reference signal corresponding to the new beam reported by the UE during the beam failure recovery process is used as the beam reference signal of the PUCCH. The beam reference signal is a reference signal for determining a sending beam.

The spatial relation information of an uplink signal is associated with a downlink signal, which may be realized by indicating a downlink reference signal through the spatial relation information of the uplink signal. In the protocol, it may be specified that the sending spatial filter of an uplink signal is the same as the receiving spatial filter of a downlink reference signal when the spatial relation information of the uplink signal indicates the downlink reference signal.

The spatial relation information of an uplink signal is associated with an uplink signal, which may be realized by indicating an uplink reference signal through the spatial relation information of the uplink signal. In the protocol, it may be specified that the sending spatial filter of an uplink signal is the same as the receiving spatial filter of an uplink reference signal when the spatial relation information of the uplink signal indicates the uplink reference signal. When sending the uplink signal actually, the UE may use the same sending beam as the sending beam sending the uplink reference signal.

In one embodiment, if the spatial relation information (Spatial Relation Info) of the PUCCH-BFR is associated with a downlink signal (for example, the spatial relation information of the PUCCH-BFR indicates a downlink reference signal, and it may be specified in the protocol that the spatial sending filter of the PUCCH-BFR uses the same method as the receiving filter of the downlink reference signal), then the reference signal corresponding to the new beam (for example, the reference signal reported in step 2) reported by the UE during the beam failure recovery process is used to cover the downlink signal (for example, the reference signal corresponding to the spatial relation info of the PUCCH-BFR is replaced with the reference signal reported by the UE during the beam failure recovery process).

In one embodiment, if the spatial relation information (Spatial Relation Info) of the PUCCH-BFR is associated with an uplink signal, the reference signal corresponding to the new beam (for example, the reference signal reported in step 2) reported by the UE during the beam failure recovery process is used to cover the uplink signal.

In one embodiment, if the spatial relation information (Spatial Relation Info) of the PUCCH-BFR is associated with an uplink signal, the spatial relation information of the PUCCH-BFR is not replaced.

One way to associate the spatial relation information (Spatial Relation Info) of the PUCCH-BFR with a downlink signal is that the spatial relation information of the PUCCH-BFR indicates a downlink reference signal. In the protocol, it may be specified that the spatial sending filter of the PUCCH-BFR is the same as the spatial receiving filter of the downlink reference signal.

One way to associate the spatial relation information (Spatial Relation Info) of the PUCCH-BFR with an uplink signal is that the spatial relation information of the PUCCH-BFR indicates the uplink signal. In the protocol, it may be specified that the spatial sending filter of the PUCCH-BFR is the same as the spatial sending filter of the uplink signal.

It should be noted that the UE may report the new beam in the form of a reference signal identifier during the beam failure recovery process.

In the standard, there may be following English description about embodiments of the present application: for SCell on which PUCCH-BFR resource is used to send step 1 during the BFR procedure, PUCCH resources are replaced with PUCCH-BFR beam, or nothing is done.

For other SCell, PUCCH beams are replaced with the new beam reported in step 2 MAC-CE.

The above English description may include following contents.

In one embodiment, for the SCell that sends the PUCCH-BFR resource in step 1 of the beam failure recovery process, the sending beam of the PUCCH resource is the sending beam of the PUCCH-BFR resource.

In one embodiment, for other cells (such as those other than the SCell which performs BFR and in which the PUCCH-BFR resource in step 1 of the BFR process is located) 1, the sending beam of the PUCCH is the new beam reported by the MAC-CE in step 2 or a sending beam corresponding to the new beam reported by the MAC-CE in step 2.

In one embodiment, for the SCell that sends the PUCCH-BFR resource in step 1 of the beam failure recovery process, the reference signal for determining the sending beam of the PUCCH resource is set to or replaced with the reference signal for determining the sending beam of the PUCCH-BFR resource.

In one embodiment, for other cells (such as those other than the SCell which performs BFR and in which the PUCCH-BFR resource in step 1 of the BFR process is located) 1, the reference signal of the PUCCH is set to or replaced with a reference signal for indicating the new beam reported by the MAC-CE in step 2.

In one embodiment, for the SCell where the PUCCH-BFR resource in step 1 of the BFR process is located, the sending beam of the PUCCH resource is the beam that sends the PUCCH-BFR.

In one embodiment, for other cells (those other than the SCell which performs BFR and in which the PUCCH-BFR resource in step 1 of the BFR process is located) 1, the sending beam of the PUCCH is the new beam reported by the MAC-CE in step 2 or a sending beam corresponding to the new beam reported by the MAC-CE in step 2.

A form in which the sending beam of the PUCCH is replaced with the beam of the PUCCH-BFR is: the PUCCH is sent using a sending beam corresponding to the PUCCH-BFR.

In one embodiment, for the SCell where the PUCCH-BFR resource in step 1 of the BFR process is located, the signal corresponding to the spatial relation information of the PUCCH resource is replaced with a signal corresponding to the spatial relation information of the PUCCH-BFR.

In one embodiment, for other cells (those other than the SCell which performs BFR and in which the PUCCH-BFR resource in step 1 of the BFR process is located), the signal corresponding to the spatial relation information of the PUCCH is replaced with a signal corresponding to the new beam reported by the MAC-CE in step 2.

It should be noted that, in an embodiment of the present application, for a cell where beam failure occurs, the UE assumes that the spatial relation information (Spatial Relation Info) of the PUCCH to be transmitted on the cell where the beam failure occurs is the same as the spatial relation information of the uplink signal that sends the beam failure event of the cell, starting from the $K^{th}$ time unit after receiving the specific information or the specific signal or after K time units after receiving the specific information or the specific signal.

Examples of some specific embodiments are given below.

Scheme 1: for a cell where beam failure occurs, starting from the $K^{th}$ symbol after receiving a response corresponding to a specific MAC-CE, the UE uses the uplink sending beam used by the PUCCH resource (PUCCH-BFR in step 1) that sends the beam failure event of the cell to send the PUCCH to be transmitted on the cell.

In one embodiment, the specific MAC-CE described in an embodiment of the present application is, for example, an MAC-CE that reports the identifier of the CC where the beam failure occurs and/or the new beam information, and the identifier of the CC where the beam failure occurs reported by the specific MAC-CE includes the identifier of the cell (i.e., the MAC-CE in step 2).

Scheme 2: for a cell where beam failure occurs, after K symbols after receiving a response corresponding to a specific MAC-CE, the UE uses the uplink sending beam used by the PUCCH resource (PUCCH-BFR in step 1) that sends the beam failure event of the cell to send the PUCCH to be transmitted on the cell. The specific MAC-CE is an MAC-CE that reports the identifier of the CC where the beam failure occurs and/or the new beam information, and the identifier of the CC where the beam failure occurs reported by the specific MAC-CE includes the identifier of the cell (the MAC-CE in step 2).

For Scheme 1 and Scheme 2, following cases are applicable.

In one embodiment, the schemes are only applicable to SCell. Or, In one embodiment, the schemes are applicable to SCell and PCell.

In one embodiment, the Scheme 1 or Scheme 2 is applied only when the UE has determined a new beam for the cell with beam failure.

In one embodiment, the Scheme 1 or Scheme 2 may be applied, regardless of whether the UE finds a new beam for the cell with beam failure.

In one embodiment, the Scheme 1 and Scheme 2 are applicable to all PUCCH resources on the cell where the beam failure occurs.

In one embodiment, the Scheme 1 and Scheme 2 are only applicable to the case where the UE in the cell where the beam failure occurs does not receive a PUCCH resource indicated or updated by the sending beam indication information (Spatial Relation Info) after sending the MAC-CE in step 2. After receiving the $K^{th}$ symbol corresponding to a response to the MAC-CE in step 2 of the cell, if the base station sends the indication or update information of the uplink sending beam of a PUCCH resource on the cell, the UE uses the uplink sending beam indicated by the base station to send the PUCCH.

In one embodiment, the UE receives a signal of a specific PDCCH (that is, any or a predefined PDCCH described above), and then considers that the UE receives a response corresponding to a specific MAC-CE. The specific PDCCH may be indicated by the base station to the UE, or may be agreed in advance.

In one embodiment, the UE receives a signal of any PDCCH that schedules the PUSCH transmission of the cell, and then considers that the UE receives a response corresponding to a specific MAC-CE.

In one embodiment, the UE receives a signal of any PDCCH for scheduling and triggering the uplink signal transmission of the cell, and then considers that the UE receives a response corresponding to a specific MAC-CE.

In one embodiment, the UE receives any PDCCH, and then considers that the UE receives a response corresponding to a specific MAC-CE.

Scheme 3: for any cell where beam failure occurs, starting from the $K^{th}$ symbol after the UE receives a UL grant after sending the PUCCH that reports the beam failure event of the cell, the UE uses the uplink sending beam used to send the PUCCH resource (PUCCH-BFR in step 1) that reports the beam failure event of the cell to send the PUCCH on the cell.

Scheme 4: for any cell where beam failure occurs, after the $K^{th}$ symbol after the UE receives a UL grant after sending the PUCCH that reports the beam failure event of the cell, the UE uses the uplink sending beam used to send the PUCCH resource (PUCCH-BFR in step 1) that reports the beam failure event of the cell to send the PUCCH on the cell.

For Scheme 3 and Scheme 4, following cases are applicable.

In one embodiment, the Scheme 3 and Scheme 4 are only applicable to SCell. Or, In one embodiment, the Scheme 3 and Scheme 4 are applicable to SCell and PCell.

In one embodiment, the Scheme 3 or Scheme 4 is applied only when the UE has determined a new beam for the cell with beam failure.

In one embodiment, the Scheme 3 or Scheme 4 may be applied, regardless of whether the UE finds a new beam for the cell with beam failure.

In one embodiment, the Scheme 3 and Scheme 4 are applicable to all PUCCH resources on the cell where the beam failure occurs.

In one embodiment, the UL grant may be a UL grant to schedule the PUSCH of the cell where the beam failure occurs, that is, the UL grant schedules the UE to send the PUSCH in the cell where the beam failure occurs.

In one embodiment, the UL grant is a UL grant indicating that the transmission of the PUSCH is the new data transmission (for example, the NDI (New data indicator) in the Downlink Control Information (DCI) indicates that the new data is transmitted) (i.e., a UL grant to schedule the new data).

In one embodiment, the UL grant is a normal UL grant to schedule the new data transmission for the HARQ process of the PUSCH carrying the MAC-CE of step 2, similar to the normal "ACK" for PUSCH (a normal uplink grant to schedule a new transmission for the same HARQ process as PUSCH carrying the step 2 MAC CE, which is the same as normal "ACK" for PUSCH).

In one embodiment, the UL grant is any UL grant (regardless of whether to indicate that the PUSCH transmission is new data transmission or data retransmission).

In one embodiment, the UL grant is DCI format 0_0.

In one embodiment, the UL grant is DCI format 0_1.

In one embodiment, the UL grant is DCI format 0_0 or DCI format 0_1.

In one embodiment, the UL grant is the first UL grant.

Some examples of time points when the UE receives the specific information or specific signal in embodiments of the present application will be introduced below.

Example 1 is as follows.

Figure 1:
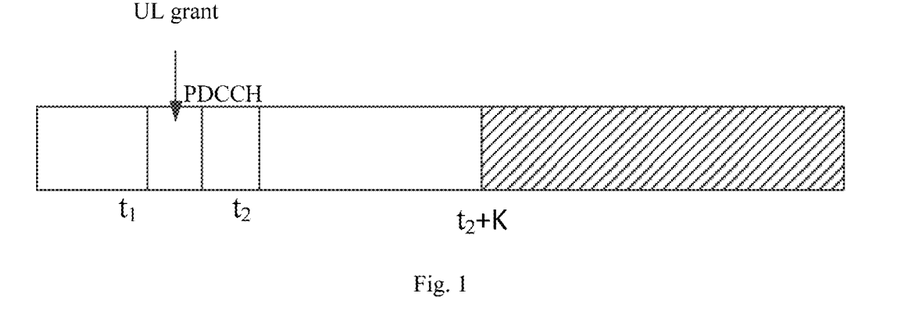
FIG. 1 is a schematic diagram of time points of signal transmission provided by an embodiment of the present application.

As shown in FIG. 1, the end time of the PDCCH where the UL grant is located is t2, and starting from t2+K, the UE uses the sending beam of the PUCCH mentioned in step 1 to send the PUCCH of the cell where the beam failure occurs.

Example 2 is as follows.

Figure 2:
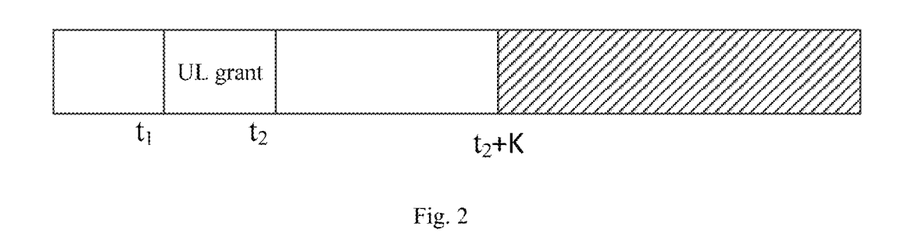
FIG. 2 is a schematic diagram of time points of signal transmission provided by an embodiment of the present application.

As shown in FIG. 2, the end time of the UL grant is t2, and starting from t2+K, the UE uses the sending beam of the PUCCH mentioned in step 1 to send the PUCCH of the cell where the beam failure occurs.

Example 3 is as follows.

Figure 3:
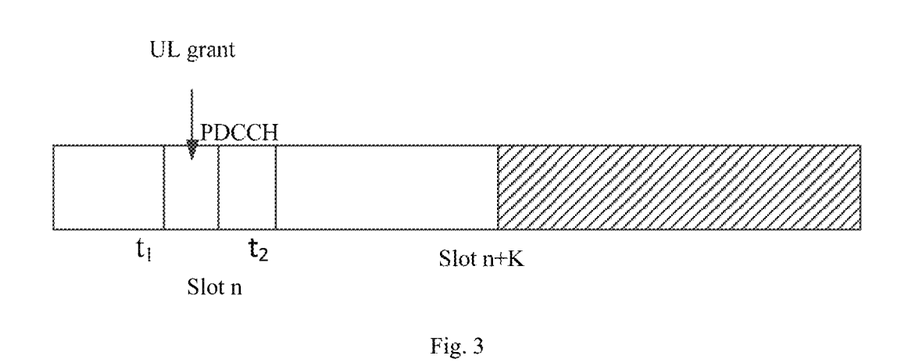
FIG. 3 is a schematic diagram of time points of signal transmission provided by an embodiment of the present application.

As shown in FIG. 3, the UL grant and PDCCH are transmitted on slot n, and starting from the slot n+K, the UE uses the sending beam of the PUCCH mentioned in step 1 to send the PUCCH of the cell where the beam failure occurs, where n is any integer greater than or equal to 0.

Example 4 is as follows.

Figure 4:
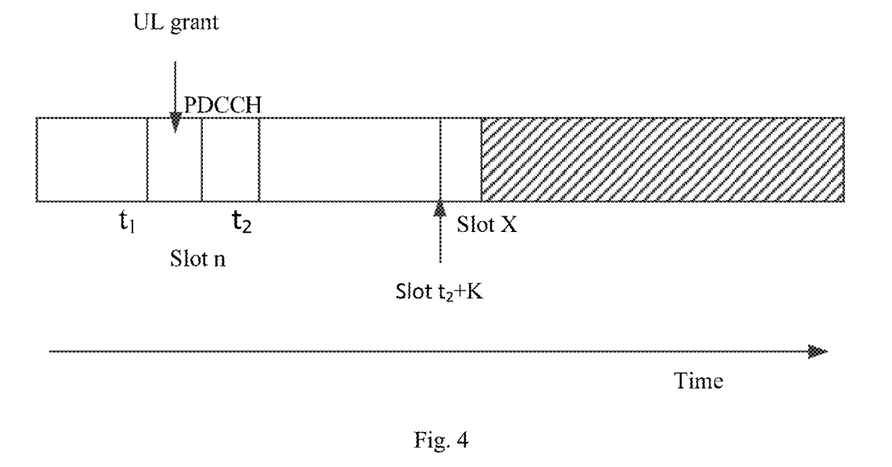
FIG. 4 is a schematic diagram of time points of signal transmission provided by an embodiment of the present application.

As shown in FIG. 4, the UL grant and PDCCH are transmitted on slot n, the end time of the PDCCH is t2, and starting from the first slot (Slot X) after the symbol t2+K, the UE uses the sending beam of the PUCCH mentioned in step 1 to send the PUCCH of the cell where the beam failure occurs, where n and X are any integers greater than or equal to 0.

Example 5 is as follows.

Figure 5:
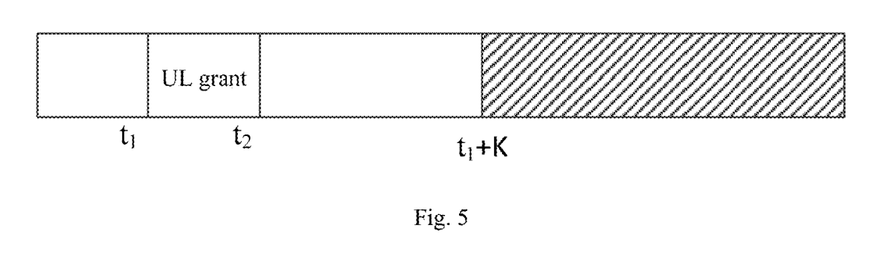
FIG. 5 is a schematic diagram of time points of signal transmission provided by an embodiment of the present application.

As shown in FIG. 5, the start time of the UL grant is t1, and starting from t1+K, the UE uses the sending beam of the PUCCH mentioned in step 1 to send the PUCCH of the cell where the beam failure occurs.

It should be noted that the above examples only give the cases where the specific information is the UL grant, and do not give the cases where the specific information is the beam failure recovery response. The cases where the specific information is the beam failure recovery response are the same as the UL grant, and will not be repeated here.

Figure 6:
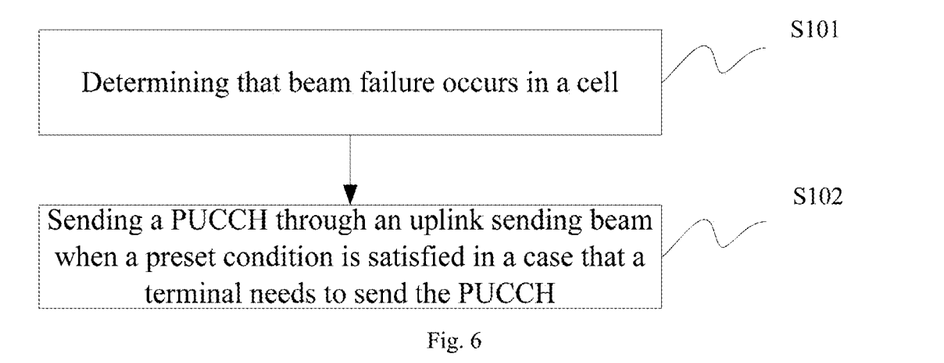
FIG. 6 is a schematic flowchart of a signal sending method on the terminal side provided by an embodiment of the present application.

To sum up, referring to FIG. 6, on the terminal side, a signal sending method provided by an embodiment of the present application includes following steps.

S101: determining that beam failure occurs in a cell.

S102: sending a PUCCH through an uplink sending beam when a preset condition is satisfied in a case that a terminal needs to send the PUCCH. The uplink sending beam includes: a beam for sending at least one of a beam failure event of the cell, an identifier of the cell, or information indicating a new beam for the cell; or, an uplink beam corresponding to spatial relation information of a resource for carrying the beam failure event of the cell; or, a beam for sending the identifier of the cell and/or the information indicating the new beam for the cell; or, an uplink beam corresponding to spatial relation information of a resource carrying the identifier of the cell and/or the new beam for the cell; or, an uplink beam corresponding to a reported new beam for the cell. The resource may be one or any combination of PUCCH resource, PUSCH resource, SRS resource, PRACH resource, BFR resource, CORESET resource, PDCCH resource.

In one embodiment, the preset condition includes: receiving specific information or a specific signal.

In one embodiment, sending the PUCCH through the uplink sending beam when the preset condition is satisfied, includes: sending the PUCCH through the uplink sending beam starting from a $K^{th}$ time unit after receiving the specific information or specific signal; or, sending the PUCCH through the uplink sending beam after K time units after receiving the specific information or specific signal; where K is a preset non-negative integer.

In one embodiment, sending the PUCCH through the uplink sending beam after K time units after receiving the specific information or specific signal, includes: sending the PUCCH through the uplink sending beam starting from a first slot after K time units after receiving the specific information or specific signal.

In one embodiment, the specific information includes one or more of: a beam failure recovery response of the cell; a UL grant received by the terminal after sending a PUCCH reporting the beam failure event of the cell.

In one embodiment, the specific signal is a signal carrying the specific information.

In one embodiment, the specific signal is a PDCCH.

Figure 7:
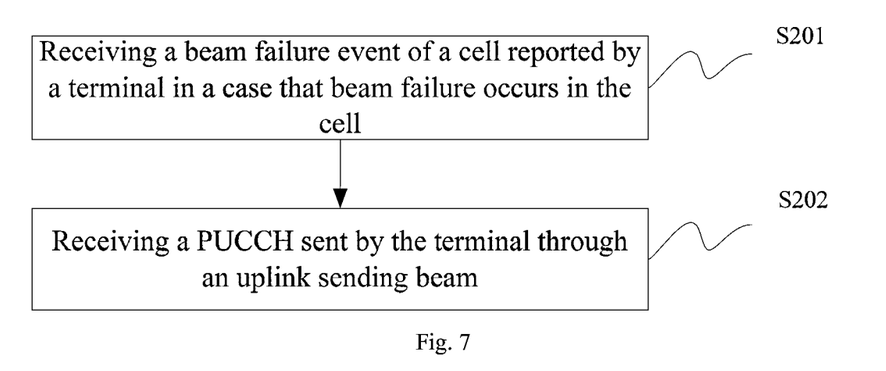
FIG. 7 is a schematic flowchart of a signal receiving method on the network side provided by an embodiment of the present application.

Correspondingly, referring to FIG. 7, on the network side, a signal receiving method provided by an embodiment of the present application includes following steps.

S201: receiving a beam failure event of a cell reported by a terminal in a case that beam failure occurs in the cell.

S202: receiving a PUCCH sent by the terminal through an uplink sending beam. The uplink sending beam includes: a beam for sending at least one of the beam failure event of the cell, an identifier of the cell, or information indicating a new beam for the cell; or, an uplink beam corresponding to spatial relation information of a resource for carrying the beam failure event of the cell; or, a beam for sending the identifier of the cell and/or the information indicating the new beam for the cell; or, an uplink beam corresponding to spatial relation information of a resource carrying the identifier of the cell and/or the new beam for the cell; or, an uplink beam corresponding to a reported new beam for the cell.

In one embodiment, the method further includes: sending specific information or a specific signal to the terminal.

In one embodiment, the PUCCH is a PUCCH sent by the terminal through the uplink sending beam starting from a $K^{th}$ time unit after receiving the specific information or specific signal; or, the PUCCH is a PUCCH sent by the terminal through the uplink sending beam after K time units after receiving the specific information or specific signal; where K is a preset non-negative integer.

In one embodiment, the specific information includes one or more of: a beam failure recovery response of the cell; uplink grant information, UL grant, received by the terminal after sending a PUCCH reporting the beam failure event of the cell.

In one embodiment, the specific signal is a Physical Downlink Control Channel (PDCCH).

In one embodiment, receiving the PUCCH sent by the terminal through the uplink sending beam, includes: receiving the PUCCH sent by the terminal through the uplink sending beam by using a receiving beam corresponding to the uplink sending beam.

Figure 8:
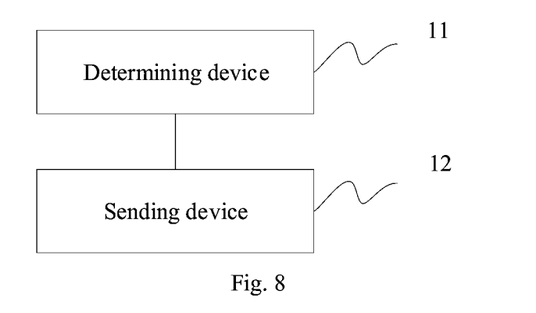
FIG. 8 is a structural schematic diagram of a signal sending apparatus on the terminal side provided by an embodiment of the present application.

Referring to FIG. 8, on the terminal side, a signal sending apparatus provided by an embodiment of the present application includes: a determining device 11 configured to determine that beam failure occurs in a cell; a sending device 12 configured to send a PUCCH through an uplink sending beam when a preset condition is satisfied in a case that a terminal needs to send the PUCCH. The uplink sending beam includes: a beam for sending at least one of a beam failure event of the cell, an identifier of the cell, or information indicating a new beam for the cell; or, an uplink beam corresponding to spatial relation information of a resource for carrying the beam failure event of the cell; or, a beam for sending the identifier of the cell and/or the information indicating the new beam for the cell; or, an uplink beam corresponding to spatial relation information of a resource carrying the identifier of the cell and/or the new beam for the cell; or, an uplink beam corresponding to a reported new beam for the cell.

It should be noted that the devices in the signal sending apparatus have the functions of executing all the processes mentioned in the above signal sending method on the terminal side, which will not be repeated here.

In one embodiment, the preset condition includes: receiving specific information or a specific signal.

In one embodiment, the sending device sends the PUCCH through the uplink sending beam when the preset condition is satisfied, includes: sending the PUCCH through the uplink sending beam starting from a $K^{th}$ time unit after receiving the specific information or specific signal; or, sending the PUCCH through the uplink sending beam after K time units after receiving the specific information or specific signal; where K is a preset non-negative integer.

In one embodiment, the sending device sends the PUCCH through the uplink sending beam after K time units after receiving the specific information or specific signal, includes: sending the PUCCH through the uplink sending beam starting from a first slot after K time units after receiving the specific information or specific signal.

In one embodiment, the specific information includes one or more of: a beam failure recovery response of the cell; uplink grant information, UL grant, received by the terminal after sending a PUCCH reporting the beam failure event of the cell.

In one embodiment, the specific signal is a signal carrying the specific information.

In one embodiment, the specific signal is a PDCCH.

In one embodiment, the PUCCH is a PUCCH transmitted in the cell where the beam failure occurs.

In one embodiment, the PUCCH is a PUCCH transmitted in a cell reporting the beam failure event, and the uplink sending beam is a beam for sending the beam failure event.

In one embodiment, the PUCCH is a PUCCH transmitted in another cell other than a cell reporting the beam failure event, and the uplink sending beam is an uplink beam corresponding to the reported new beam for the cell.

In one embodiment, when spatial relation information of the PUCCH is associated with a downlink signal, the uplink sending beam is an uplink beam corresponding to the reported new beam for the cell; and/or when the spatial relation information of the PUCCH is associated with an uplink signal, the uplink sending beam is a beam for sending the beam failure event or a sending beam of the uplink signal associated with the spatial relation information of the PUCCH.

Figure 9:
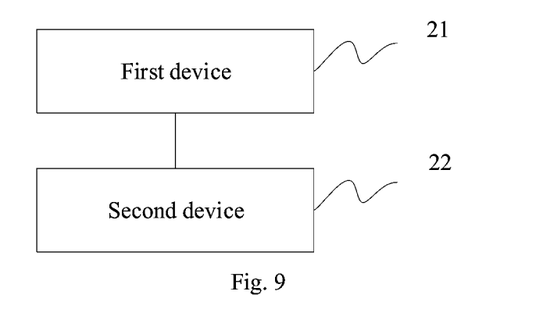
FIG. 9 is a structural schematic diagram of a signal receiving apparatus on the network side provided by an embodiment of the present application.

Correspondingly, referring to FIG. 9, on the network side, a signal receiving apparatus provided by an embodiment of the present application includes: a first device 21 configured to receive a beam failure event of a cell reported by a terminal in a case that beam failure occurs in the cell; a second device 22 configured to receive a PUCCH sent by the terminal through an uplink sending beam. The uplink sending beam includes: a beam for sending at least one of the beam failure event of the cell, an identifier of the cell, or information indicating a new beam for the cell; or, an uplink beam corresponding to spatial relation information of a resource for carrying the beam failure event of the cell; or, a beam for sending the identifier of the cell and/or the information indicating the new beam for the cell; or, an uplink beam corresponding to spatial relation information of a resource carrying the identifier of the cell and/or the new beam for the cell; or, an uplink beam corresponding to a reported new beam for the cell.

In one embodiment, the apparatus further includes: a third device configured to send specific information or a specific signal to the terminal.

In one embodiment, the PUCCH is a PUCCH sent by the terminal through the uplink sending beam starting from a $K^{th}$ time unit after receiving the specific information or specific signal; or, the PUCCH is a PUCCH sent by the terminal through the uplink sending beam after K time units after receiving the specific information or specific signal; where K is a preset non-negative integer.

In one embodiment, the specific information includes one or more of: a beam failure recovery response of the cell; uplink grant information, UL grant, received by the terminal after sending a PUCCH reporting the beam failure event of the cell.

In one embodiment, the specific signal is a Physical Downlink Control Channel (PDCCH).

In one embodiment, the PUCCH is a PUCCH transmitted in the cell where the beam failure occurs.

In one embodiment, the PUCCH is a PUCCH transmitted in a cell reporting the beam failure event, and the uplink sending beam is a beam for sending the beam failure event.

In one embodiment, the PUCCH is a PUCCH transmitted in another cell other than a cell reporting the beam failure event, and the uplink sending beam is an uplink beam corresponding to the reported new beam for the cell.

In one embodiment, when spatial relation information of the PUCCH is associated with a downlink signal, the uplink sending beam is an uplink beam corresponding to the reported new beam for the cell; and/or when the spatial relation information of the PUCCH is associated with an uplink signal, the uplink sending beam is a beam for sending the beam failure event or a sending beam of the uplink signal associated with the spatial relation information of the PUCCH.

In one embodiment, receiving the PUCCH sent by the terminal through the uplink sending beam, includes: receiving the PUCCH sent by the terminal through the uplink sending beam by using a receiving beam corresponding to the uplink sending beam.

It should be noted that the devices in the signal receiving apparatus have the functions of executing all the processes mentioned in the above signal receiving method on the network side, which will not be repeated here.

Figure 10:
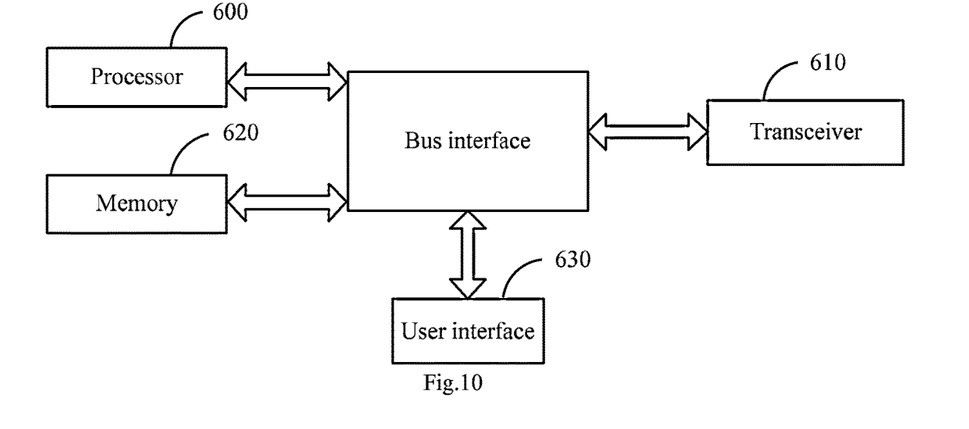
FIG. 10 is a structural schematic diagram of another signal sending apparatus on the terminal side provided by an embodiment of the present application.

Referring to FIG. 10, on the terminal side, another signal sending apparatus provided by an embodiment of the present application includes: a processor 600 configured to read programs in a memory 620 to perform: determining that beam failure occurs in a cell; sending a PUCCH through an uplink sending beam when a preset condition is satisfied in a case that a terminal needs to send the PUCCH. The uplink sending beam includes: a beam for sending at least one of a beam failure event of the cell, an identifier of the cell, or information indicating a new beam for the cell; or, an uplink beam corresponding to spatial relation information of a resource for carrying the beam failure event of the cell; or, a beam for sending the identifier of the cell and/or the information indicating the new beam for the cell; or, an uplink beam corresponding to spatial relation information of a resource carrying the identifier of the cell and/or the new beam for the cell; or, an uplink beam corresponding to a reported new beam for the cell.

In one embodiment, the preset condition includes: receiving specific information or a specific signal.

In one embodiment, sending the PUCCH via a transceiver 610 through the uplink sending beam when the preset condition is satisfied, includes: sending the PUCCH via the transceiver 610 through the uplink sending beam starting from a $K^{th}$ time unit after receiving the specific information or specific signal via the transceiver 610; or, sending the PUCCH via the transceiver 610 through the uplink sending beam after K time units after receiving the specific information or specific signal via the transceiver 610; where K is a preset non-negative integer.

In one embodiment, sending the PUCCH via the transceiver 610 through the uplink sending beam after K time units after receiving the specific information or specific signal via the transceiver 610, includes: sending the PUCCH via the transceiver 610 through the uplink sending beam starting from a first slot after K time units after receiving the specific information or specific signal via the transceiver 610.

In one embodiment, the specific information includes one or more of: a beam failure recovery response of the cell; uplink grant information, UL grant, received by the terminal after sending a PUCCH reporting the beam failure event of the cell.

In one embodiment, the specific signal is a signal carrying the specific information.

In one embodiment, the specific signal is a PDCCH.

The transceiver 610 is configured to receive and send data under control of the processor 600.

Here, in FIG. 10, the bus architecture may include any numbers of interconnected buses and bridges, and link various circuits of one or more processors represented by the processor 600 and the memory represented by the memory 620. The bus architecture may further link various other circuits such as a peripheral device, a voltage regulator and a power management circuit, which are all well known in the art and thus will not be further described again herein. The bus interface provides an interface. The transceiver 610 may be multiple elements, i.e., include a transmitter and a receiver, and provide the devices for communicating with various other devices over the transmission media. For different user equipments, the user interface 630 may also be the interface for inter-connecting or exter-connecting with the required devices, and the connected devices include but not limited to a keypad, a display, a loudspeaker, a microphone, a joystick and the like.

The processor 600 is responsible for managing the bus architecture and general processing, and the memory 620 may store the data used by the processor 600 when performing operations.

In one embodiment, the processor 600 may be Central Processing Unit (CPU), Application Specific Integrated Circuit (ASIC), Field-Programmable Gate Array (FPGA) or Complex Programmable Logic Device (CPLD).

Figure 11:
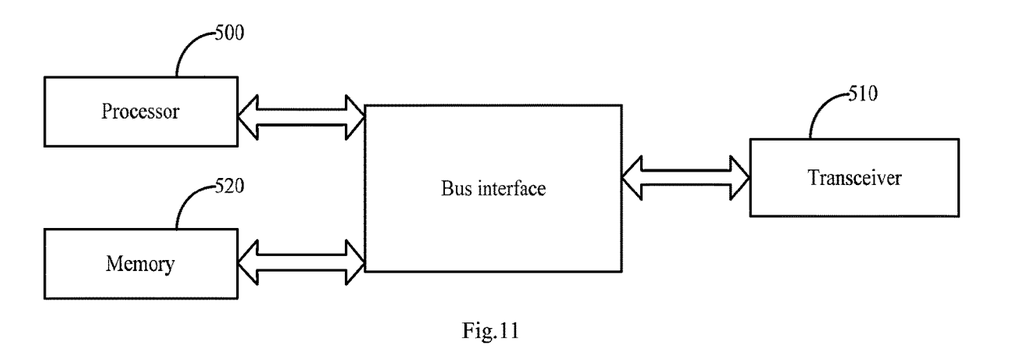
FIG. 11 is a structural schematic diagram of another signal receiving apparatus on the network side provided by an embodiment of the present application.

Correspondingly, referring to FIG. 11, on the network side, another signal receiving apparatus provided by an embodiment of the present application includes: a processor 500 configured to read programs in a memory 520 to perform: receiving a beam failure event of a cell reported by a terminal via a transceiver 510 in a case that beam failure occurs in the cell; receiving a PUCCH sent by the terminal through an uplink sending beam via the transceiver 510. The uplink sending beam includes: a beam for sending at least one of the beam failure event of the cell, an identifier of the cell, or information indicating a new beam for the cell; or, an uplink beam corresponding to spatial relation information of a resource for carrying the beam failure event of the cell; or, a beam for sending the identifier of the cell and/or the information indicating the new beam for the cell; or, an uplink beam corresponding to spatial relation information of a resource carrying the identifier of the cell and/or the new beam for the cell; or, an uplink beam corresponding to a reported new beam for the cell.

In one embodiment, the processor 500 is further configured to read programs in the memory 520 to perform: sending specific information or a specific signal to the terminal via the transceiver 510.

In one embodiment, the PUCCH is a PUCCH sent by the terminal through the uplink sending beam starting from a $K^{th}$ time unit after receiving the specific information or specific signal; or, the PUCCH is a PUCCH sent by the terminal through the uplink sending beam after K time units after receiving the specific information or specific signal; where K is a preset non-negative integer.

In one embodiment, the specific information includes one or more of: a beam failure recovery response of the cell; uplink grant information, UL grant, received by the terminal after sending a PUCCH reporting the beam failure event of the cell.

In one embodiment, the specific signal is a Physical Downlink Control Channel (PDCCH).

In one embodiment, receiving the PUCCH sent by the terminal through the uplink sending beam via the transceiver 510, includes: receiving the PUCCH sent by the terminal through the uplink sending beam via the transceiver 510 by using a receiving beam corresponding to the uplink sending beam.

The transceiver 510 is configured to receive and send data under control of the processor 500.

Here, in FIG. 11, the bus architecture may include any numbers of interconnected buses and bridges, and link various circuits of one or more processors represented by the processor 500 and the memory represented by the memory 520. The bus architecture may further link various other circuits such as a peripheral device, a voltage regulator and a power management circuit, which are all well known in the art and thus will not be further described again herein. The bus interface provides an interface. The transceiver 510 may be multiple elements, i.e., include a transmitter and a receiver, and provide the devices for communicating with various other devices over the transmission media. The processor 500 is responsible for managing the bus architecture and general processing, and the memory 520 may store the data used by the processor 500 when performing the operations.

The processor 500 may be Central Processing Unit (CPU), Application Specific Integrated Circuit (ASIC), Field-Programmable Gate Array (FPGA) or Complex Programmable Logic Device (CPLD).

It should be noted that the division of devices in embodiments of the present application is illustrative, and is merely a kind of logical function division, and there may be other division methods in actual implementations. In addition, the functional devices in each embodiment of the present application may be integrated into one processing device, or each device may exist alone physically, or two or more devices may be integrated into one device. The above-mentioned integrated devices may be implemented in the form of hardware, or may be implemented in the form of software functional devices.

When the integrated device is implemented in the form of software functional device and sold or used as an independent product, it may be stored in a computer readable storage medium. Based on such understanding, the embodiments of the present application essentially or a part that contributes to the related art or all or a part may be embodied in the form of software product. The computer software product is stored in a storage medium, and includes several instructions used to enable a computer device (which may be a personal computer, server, or network device, etc.) or a processor to perform all or some of the steps of the methods of various embodiments of the present application. The above-mentioned storage medium includes: USB flash drive, mobile hard disk, Read-Only Memory (ROM), Random Access Memory (RAM), magnetic disk or compact disc or various media that can store the program codes.

An embodiment of the present application provides a computing device, which may be a desktop computer, a portable computer, a smart phone, a tablet computer, a Personal Digital Assistant (PDA) or the like. The computing device may include a Center Processing Unit (CPU), a memory, input/output devices and the like. The input device may include a keyboard, a mouse, a touch screen and the like, and the output device may include a display device such as Liquid Crystal Display (LCD), Cathode Ray Tube (CRT) or the like.

The memory may include a Read-Only Memory (ROM) and a Random Access Memory (RAM), and provide the program instructions and data stored in the memory to the processor. In an embodiment of the present application, the memory may be used to store the program of any one of the methods provided by embodiments of the present application.

The processor invokes the program instructions stored in the memory and is configured to perform any one of the methods provided by embodiments of the present application in accordance with the obtained program instructions.

An embodiment of the present application provides a computer storage medium for storing the computer program instructions used by the apparatuses provided by embodiments of the present application described above. The computer storage medium contains the program for performing any one of the methods provided by embodiments of the present application described above.

The computer storage medium may be any available media or data storage device accessible to the computer, including but not limited to magnetic memory (e.g., floppy disk, hard disk, magnetic tape, Magnetic Optical disc (MO) or the like), optical memory (e.g., CD, DVD, BD, HVD or the like), semiconductor memory (e.g., ROM, EPROM, EEPROM, nonvolatile memory (NAND FLASH), Solid State Disk (SSD)) or the like.

The methods provided by embodiments of the present application may be applied to the terminal devices, and may also be applied to the network devices.

Here, the terminal device can also be referred to as the User Equipment ("UE" for short), Mobile Station ("MS" for short), Mobile Terminal ("MT" for short) or the like. In one embodiment, the terminal can has the ability of communicating with one or more core networks via the Radio Access Network (RAN). For example, the terminal may be a mobile telephone (or called "cellular" telephone), or a computer with the mobile property. For example, the terminal can also be a portable, pocket, handheld, computer built-in or vehicle-carried mobile device.

The network device may be a base station (e.g., access point), which means the device in the access network communicating with the wireless terminal via one or more sectors over the air interface. The base station may be used to perform the inter-conversion between the received air frame and the IP packet, and used as the router between the wireless terminal and the rest of the access network, where the rest of the access network may include Internet Protocol (IP) networks. The base station may further coordinate the attribute management of the air interface. For example, the base station may be the BTS in the GSM or CDMA, or may be the NodeB in the WCDMA, or may be the NodeB or eNB or e-NodeB (evolutional Node B) in the LTE, or may be the gNB in the 5G system, or the like, which is not limited in embodiments of the present application.

The processing flows of the above methods may be implemented by a software program, which may be stored in a storage medium. When the stored software program is invoked, the above method steps are performed.

To sum up, compared with the related art, embodiments of the present application propose some solutions for determining the sending beam of the PUCCH of a UE after beam failure occurs in the cell, and the UE can use a better uplink sending beam to send the PUCCH, and the UE and the network side have the same consensus on the sending beam of the uplink signal, and the base station can use the optimal reception beam to receive the uplink signal.

The embodiments of the present application can provide methods, systems and computer program products. Thus, the present application can take the form of hardware embodiments alone, software embodiments alone, or embodiments combining the software and hardware aspects. Also, the present application can take the form of computer program products implemented on one or more computer usable storage mediums (including but not limited to magnetic disk memories, optical memories and the like) containing computer usable program codes therein.

The present application is described by reference to the flow charts and/or the block diagrams of the methods, the devices (systems) and the computer program products according to embodiments of the present application. It should be understood that each process and/or block in the flow charts and/or the block diagrams, and a combination of processes and/or blocks in the flow charts and/or the block diagrams may be implemented by the computer program instructions. These computer program instructions may be provided to a general-purpose computer, a dedicated computer, an embedded processor, or a processor of another programmable data processing device to produce a machine, and an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which guides the computer or another programmable data processing device to operate in a particular way, and the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, and a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:
1. A signal sending method, the method comprising:
determining that beam failure occurs in a cell;
sending a Physical Uplink Control Channel, PUCCH, through an uplink sending beam when a preset condition is satisfied in a case that a terminal needs to send the PUCCH, wherein the PUCCH is a PUCCH trans- mitted in the cell where the beam failure occurs, wherein the uplink sending beam comprises:
a beam for sending at least one of a beam failure event of the cell, an identifier of the cell, or information indicating a new beam for the cell;
or, an uplink beam corresponding to spatial relation information of a resource for carrying the beam failure event of the cell;
or, an uplink beam corresponding to spatial relation information of a resource carrying the identifier of the cell and/or the new beam for the cell;
or, an uplink beam corresponding to a reported new beam for the cell.

2. The method according to claim 1, wherein the preset condition comprises:
receiving specific information or a specific signal.

3. The method according to claim 2, wherein the sending the PUCCH through the uplink sending beam when the preset condition is satisfied, comprises:
sending the PUCCH through the uplink sending beam starting from a $K^{th}$ time unit after receiving the specific information or specific signal;
or, sending the PUCCH through the uplink sending beam after K time units after receiving the specific information or specific signal;
wherein K is a preset non-negative integer.

4. The method according to claim 3, wherein sending the PUCCH through the uplink sending beam after K time units after receiving the specific information or specific signal, comprises: sending the PUCCH through the uplink sending beam starting from a first slot after K time units after receiving the specific information or specific signal.

5. The method according to claim 2, wherein the specific information comprises one or more of:
a beam failure recovery response of the cell;
uplink grant information, UL grant, received by the terminal after sending a PUCCH reporting the beam failure event of the cell.

6. The method according to claim 2, wherein the specific signal is a Physical Downlink Control Channel, PDCCH.

7. The method according to claim 1, wherein the PUCCH is a PUCCH transmitted in a cell reporting the beam failure event, and the uplink sending beam is a beam for sending the beam failure event.

8. The method according to claim 1, wherein the PUCCH is a PUCCH transmitted in another cell other than a cell reporting the beam failure event, and the uplink sending beam is an uplink beam corresponding to the reported new beam for the cell.

9. The method according to claim 1, wherein, when spatial relation information of the PUCCH is associated with a downlink signal, the uplink sending beam is an uplink beam corresponding to the reported new beam for the cell; and/or
when the spatial relation information of the PUCCH is associated with an uplink signal, the uplink sending beam is a beam for sending the beam failure event or a sending beam of the uplink signal associated with the spatial relation information of the PUCCH.

10. A signal receiving method, the method comprising:
receiving a beam failure event of a cell reported by a terminal in a case that beam failure occurs in the cell;
receiving a Physical Uplink Control Channel, PUCCH, sent by the terminal through an uplink sending beam, wherein the PUCCH is a PUCCH transmitted in the cell where the beam failure occurs; wherein the uplink sending beam comprises:
a beam for sending at least one of the beam failure event of the cell, an identifier of the cell, or information indicating a new beam for the cell;
or, an uplink beam corresponding to spatial relation information of a resource for carrying the beam failure event of the cell;
or, a beam for sending the identifier of the cell and/or the information indicating the new beam for the cell;
or, an uplink beam corresponding to spatial relation information of a resource carrying the identifier of the cell and/or the new beam for the cell;
or, an uplink beam corresponding to a reported new beam for the cell.

11. The method according to claim 10, further comprising: sending specific information or a specific signal to the terminal.

12. The method according to claim 11, wherein the PUCCH is a PUCCH sent by the terminal through the uplink sending beam starting from a $K^{th}$ time unit after receiving the specific information or specific signal;
or, the PUCCH is a PUCCH sent by the terminal through the uplink sending beam after K time units after receiving the specific information or specific signal;
wherein K is a preset non-negative integer.

13. The method according to claim 11, wherein the specific signal is a Physical Downlink Control Channel, PDCCH.

14. A signal sending apparatus, comprising:
a memory configured to store program instructions;
a processor configured to invoke the program instructions stored in the memory, and execute according to an obtained program:
determining that beam failure occurs in a cell;
sending a Physical Uplink Control Channel, PUCCH, through an uplink sending beam when a preset condition is satisfied in a case that a terminal needs to send the PUCCH, wherein the PUCCH is a PUCCH transmitted in the cell where the beam failure occurs, wherein the uplink sending beam comprises:
a beam for sending at least one of a beam failure event of the cell, an identifier of the cell, or information indicating a new beam for the cell;
or, an uplink beam corresponding to spatial relation information of a resource for carrying the beam failure event of the cell;
or, a beam for sending the identifier of the cell and/or the information indicating the new beam for the cell;
or, an uplink beam corresponding to spatial relation information of a resource carrying the identifier of the cell and/or the new beam for the cell;
or, an uplink beam corresponding to a reported new beam for the cell.

15. The apparatus according to claim 14, wherein the preset condition comprises:
receiving specific information or a specific signal.

16. The apparatus according to claim 15, wherein the sending the PUCCH through the uplink sending beam when the preset condition is satisfied, comprises:
sending the PUCCH through the uplink sending beam starting from a $K^{th}$ time unit after receiving the specific information or specific signal;
or, sending the PUCCH through the uplink sending beam after K time units after receiving the specific information or specific signal;
wherein K is a preset non-negative integer.

17. The apparatus according to claim 15, wherein the specific signal is a Physical Downlink Control Channel, PDCCH.

18. A signal receiving apparatus, comprising:
   a memory configured to store program instructions;
   a processor configured to invoke the program instructions stored in the memory, and execute the method according to claim 12.

19. The apparatus according to claim 18, wherein the processor is further configured to invoke the program instructions stored in the memory and execute according to an obtained program: sending specific information or a specific signal to the terminal.

\* \* \* \* \*